(12) United States Patent
Kim et al.

(10) Patent No.: US 11,169,566 B2
(45) Date of Patent: Nov. 9, 2021

(54) ELECTRONIC DEVICE INCLUDING FOLDABLE DISPLAY AND METHOD FOR OPERATING THE ELECTRONIC DEVICE

(71) Applicant: Samsung Electronics Co., Ltd., Gyeonggi-do (KR)

(72) Inventors: Jongjin Kim, Gyeonggi-do (KR); Daehan Wi, Gyeonggi-do (KR); Oheon Kwon, Gyeonggi-do (KR); Jeongmin Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 93 days.

(21) Appl. No.: 16/796,281

(22) Filed: Feb. 20, 2020

(65) Prior Publication Data
US 2020/0264659 A1   Aug. 20, 2020

(30) Foreign Application Priority Data

Feb. 20, 2019 (KR) .......................... 10-2019-0019823

(51) Int. Cl.
*G06F 1/16* (2006.01)
*H04M 1/724* (2021.01)
*G06F 3/0346* (2013.01)
*G06F 3/0488* (2013.01)

(52) U.S. Cl.
CPC .......... *G06F 1/1616* (2013.01); *G06F 1/1694* (2013.01); *G06F 3/0346* (2013.01); *G06F 3/04886* (2013.01); *H04M 1/724* (2021.01)

(58) Field of Classification Search
None
See application file for complete search history.

(56) References Cited

U.S. PATENT DOCUMENTS

| 9,537,527 | B2 | 1/2017 | Huh et al. |
| 9,710,161 | B2 | 7/2017 | Ryu et al. |
| 9,843,658 | B2 | 12/2017 | Huh et al. |

(Continued)

FOREIGN PATENT DOCUMENTS

| KR | 1020160080034 | 7/2016 |
| KR | 1020190001864 | 1/2019 |

OTHER PUBLICATIONS

International Search Report dated Jun. 11, 2020 issued in counterpart application No. PCT/KR2020/002472, 10 pages.

*Primary Examiner* — Toan H Vu
(74) *Attorney, Agent, or Firm* — The Farrell Law Firm, P.C.

(57) ABSTRACT

Disclosed is an electronic device including a housing having a first housing structure and a second housing structure that is foldable relative to the first housing structure about a first axis, a foldable display including a first portion disposed in the first housing structure and a second portion disposed in the second housing structure, the first portion being foldable relative to the second portion about a second axis parallel to the first axis, a first motion sensor disposed in the first housing structure, a second motion sensor disposed in the second housing structure, a processor located in the housing and operatively coupled with the foldable display, the first motion sensor, and the second motion sensor, and a memory operatively coupled with the processor. When folded, the electronic device may change the direction of a user interface output through the display, depending on a user's intent.

20 Claims, 13 Drawing Sheets

(56) References Cited

U.S. PATENT DOCUMENTS

| | | | |
|---|---|---|---|
| 9,864,410 B2 | 1/2018 | La et al. | |
| 9,887,722 B2 | 2/2018 | Moon et al. | |
| 10,073,668 B2 | 9/2018 | Chun et al. | |
| 2014/0164986 A1* | 6/2014 | Yang | G06F 3/04886 715/784 |
| 2015/0153778 A1 | 6/2015 | Jung | |
| 2015/0338888 A1 | 11/2015 | Kim et al. | |
| 2015/0338937 A1* | 11/2015 | Shepelev | G06F 3/03545 345/179 |
| 2017/0075640 A1 | 3/2017 | Chun et al. | |
| 2017/0099072 A1 | 4/2017 | Moon et al. | |
| 2017/0264888 A1* | 9/2017 | Valentine | H04N 13/317 |
| 2017/0371450 A1* | 12/2017 | Heller | G06F 1/1694 |
| 2019/0228582 A1* | 7/2019 | Yerkes | G06F 3/016 |
| 2020/0201387 A1* | 6/2020 | Knoppert | H05K 7/20172 |

\* cited by examiner

ELECTRONIC DEVICE INCLUDING FOLDABLE DISPLAY AND METHOD FOR OPERATING THE ELECTRONIC DEVICE

CROSS-REFERENCE TO RELATED APPLICATION(S)

This application is based on and claims priority under 35 U.S.C. § 119 to Korean Patent Application No. 10-2019-0019823, filed on Feb. 20, 2019, in the Korean Intellectual Property Office, the entire disclosure of which is incorporated herein by reference.

BACKGROUND

1. Field

The disclosure relates generally to an electronic device, and more particularly, to an electronic device including a foldable display and a method for operating the electronic device.

2. Description of Related Art

Due to an increasing demand for larger screens, the overall size of electronic devices has also increased. Due to this increased size, users may enjoy various types of contents (e.g., games or movies) through large screens and may easily control the electronic devices through large icons. However, portability of the large-sized electronic devices is compromised. Recently, therefore, efforts have been made to develop an electronic device including a foldable display (hereinafter, "foldable electronic device") that provides a larger screen to a user yet has enhanced portability.

The foldable electronic device may include a flexible display having a first area and a second area that extends from a folding area in opposite directions. The first area and the second area may be disposed in a first housing structure and a second housing structure, respectively, which structures may be connected through a hinge. When a user folds the foldable electronic device, the first area and the second area may be superimposed on each other, enabling the user to easily carry the foldable electronic device.

The first area and the second area of the display of the foldable electronic device may be controlled using a plurality of sensors disposed in the first housing structure and the second housing structure. For example, the foldable electronic device may output a user interface of an application through the first area and the second area, based on data obtained through the sensors. However, when the foldable electronic device is folded, data obtained by a first sensor disposed in the first housing structure may differ from data obtained by a second sensor disposed in the second housing structure. Accordingly, the directions of the user interface output on the first area and the second area may differ from each other, or the directions of the user interface may not change even though the electronic device is folded.

Thus, there is a need in the art for a foldable electronic device that cures the data disparities realized by the foldable electronic device in the conventional art.

SUMMARY

The disclosure is provided to address at least the above-mentioned problems and/or disadvantages and to provide at least the advantages described below.

Accordingly, an aspect of the disclosure is to provide a foldable electronic device that, when folded, may change the direction of a user interface output through the display, depending on a user's intent.

In accordance with an aspect of the disclosure, an electronic device includes a housing including a first housing structure and a second housing structure that is foldable relative to the first housing structure about a first axis, a foldable display including a first portion disposed in the first housing structure and a second portion disposed in the second housing structure, the first portion being foldable relative to the second portion about a second axis parallel to the first axis, a first motion sensor disposed in the first housing structure, a second motion sensor disposed in the second housing structure, a processor located in the housing and operatively coupled with the foldable display, the first motion sensor and the second motion sensor, and a memory operatively coupled with the processor, the memory storing instructions that, when executed, cause the processor to output at least one user interface on at least one of the first portion and the second portion of the foldable display, obtain first data from the first motion sensor, obtain second data from the second motion sensor, and determine a direction of the user interface, based at least partly on the first data or the second data.

In accordance with another aspect of the disclosure, an electronic device includes a housing including a first edge, a second edge opposite the first edge, a third edge connected to a first end of the first edge and a first end of the second edge, a fourth edge connected to a second end of the first edge opposite to the first end of the first edge and a second end of the second edge opposite to the first end of the second edge, a hinge connected to the first edge and the second edge, a first housing structure corresponding to an area between the third edge and the hinge, and a second housing structure corresponding to an area between the fourth edge and the hinge, wherein each of the first edge and the second edge is foldable about the hinge, and wherein the first housing structure and the second housing structure face each other in a folded state of the first edge and the second edge, a foldable display including a first area extending from the hinge in a first direction and a second area extending from the hinge in a second direction opposite to the first direction, a first sensor disposed in the first housing structure, a second sensor disposed in the second housing structure, a memory configured to store a plurality of applications, and a processor configured to execute at least one of the plurality of applications, wherein the memory stores instructions that, when executed, cause the processor to detect which of the first area and the second area includes a starting point at which a user interface of the executed application starts to be output on the foldable display based on the foldable display being folded, obtain data related to an area in which the starting point is located, from one of the first sensor and the second sensor that corresponds to the area in which the starting point is located, and determine whether to rotate the user interface in the area in which the starting point is located, based on the data.

In accordance with another aspect of the disclosure, an electronic device includes a housing including a first edge, a second edge opposite the first edge, a third edge connected to a first end of the first edge and a first end of the second edge, a fourth edge connected to a second end of the first edge opposite to the first end of the first edge and a second end of the second edge opposite to the first end of the second edge, a hinge connected to the first edge and the second edge, a first housing structure corresponding to an area between the third edge and the hinge, and a second housing structure corresponding to an area between the fourth edge and the hinge, wherein each of the first edge and the second edge is foldable about the hinge, and wherein the first housing structure and the second housing structure face each other in a folded state of the first edge and the second edge, a foldable display including a first area extending from the hinge in a first direction and a second area extending from the hinge in a second direction opposite to the first direction, a first sensor disposed in the first housing structure, a second sensor disposed in the second housing structure, a memory configured to store a plurality of applications, and a processor configured to execute at least one of the plurality of applications, wherein the memory stores instructions that, when executed, cause the processor to measure, in a first area, based on data obtained by the first sensor, an x-1 axis that is perpendicular to the third edge and that extends toward the hinge from the third edge, a y-1 axis that is parallel to the third edge and that extends toward the second edge from the first edge, and a z-1 axis that is perpendicular to the x-1 axis and the y-1 axis, measure, in a second area, based on data obtained by the second sensor, an x-2 axis that is perpendicular to the fourth edge and that extends toward the hinge from the fourth edge, a y-2 axis that is parallel to the fourth edge and that extends toward the second edge from the first edge, and a z-2 axis that is perpendicular to the x-2 axis and the y-2 axis, generate an x-3 axis, a y-3 axis, and a z-3 axis by merging the x-1, y-1 and z-1 axes of the first area and the x-2, y-2 and z-2 axes of the second area, respectively, and output a user interface of the executed application through the foldable display, based on the x-3, y-3 and z-3 axes.

In accordance with another aspect of the disclosure, an electronic device includes a housing including a first housing structure and a second housing structure that is foldable relative to the first housing structure about a first axis, a foldable display including a first portion disposed in the first housing structure and a second portion disposed in the second housing structure, the first portion being foldable relative to the second portion about a second axis parallel to the first axis, a first motion sensor disposed in the first housing structure, a second motion sensor disposed in the second housing structure, a processor located in the housing and operatively coupled with the foldable display, the first motion sensor, and the second motion sensor, and a memory operatively coupled with the processor, wherein the memory stores instructions that, when executed, cause the processor to obtain first data from the first motion sensor, obtain second data from the second motion sensor, output a first interface on the first portion of the foldable display, output a second interface on the second portion of the foldable display, and transmit at least part of the first data or the second data to at least one of the first interface or the second interface.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
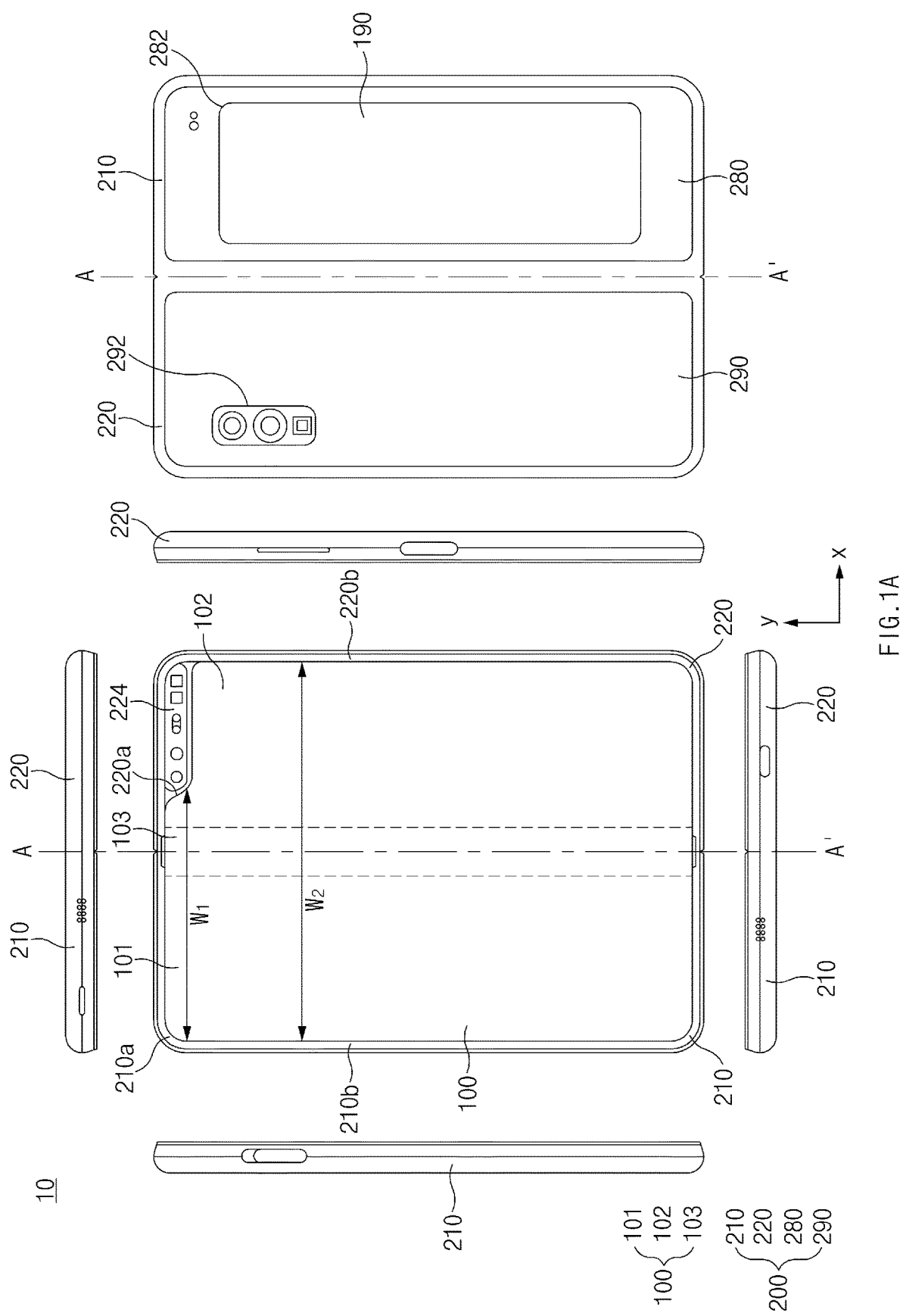
FIG. 1A illustrates a flat state of an electronic device according to an embodiment.

Hereinafter, embodiments will be described in detail in conjunction with the accompanying drawings. A detailed description of known functions or configurations incorporated herein will be omitted for the sake of clarity and conciseness.

The electronic device according to embodiments may be one of various types of electronic devices, including but not limited to a portable communication device (e.g., a smartphone), a computer device, a portable multimedia device, a portable medical device, a camera, a wearable device, or a home appliance.

It should be appreciated that embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to distinguish a corresponding component from another, and do not limit the components in importance or order. It is to be understood that if an element, such as a first element, is referred to, with or without the term "operatively" or "communicatively", as "coupled with," "coupled to," "connected with," or "connected to" another element, such as a second element, it is indicated that the first element may be directly (e.g., wiredly) coupled with the second element, wirelessly, or via a third element.

FIG. 1A illustrates a flat state of an electronic device according to an embodiment.

Referring to FIG. 1A, the electronic device 10 includes a foldable housing 200, a hinge cover 230 that covers a foldable portion of the foldable housing 200, and a flexible or foldable display 100 (hereinafter, display) that is disposed in a space formed by the foldable housing 200. In this disclosure, a surface on which the display 100 is disposed is defined as a first surface or a front surface of the electronic device 10. A surface opposite to the front surface is defined as a second surface or a rear surface of the electronic device 10. Surfaces that surround a space between the front surface and the rear surface are defined as third surfaces or side surfaces of the electronic device 10.

The foldable housing 200 includes a first housing structure 210, a second housing structure 220 including a sensor area 224, a first back cover 280, and a second back cover 290. The foldable housing 200 of the electronic device 10 is not limited to the form and coupling illustrated in FIGS. 1A, 1B, and 2 and may be implemented by a combination and/or coupling of other shapes or parts. For example, the first housing structure 210 and the first back cover 280 may be integrally formed with each other, and the second housing structure 220 and the second back cover 290 may be integrally formed with each other.

The first housing structure 210 and the second housing structure 220 may be disposed on opposite sides of a folding axis A and may have shapes that are entirely symmetric to each other with respect to the folding axis A. As will be described below, the angle or distance between the first housing structure 210 and the second housing structure 220 may vary depending on whether the electronic device 10 is in a flat, folded, or intermediate state. Unlike the first housing structure 210, the second housing structure 220 may additionally include the sensor area 224 in which various sensors are arranged, but may have a mutually symmetrical shape in the other area.

In FIG. 1A, the first housing structure 210 and the second housing structure 220 may together form a recess in which the display 100 is received. Due to the sensor area 224, the recess may have at least two different widths in a direction perpendicular to the folding axis A.

For example, the recess may have a first width w1 between a first portion 210a of the first housing structure 210 that is parallel to the folding axis A and a first portion 220a of the second housing structure 220 that is formed on the periphery of the sensor area 224, and a second width w2 formed by a second portion 210b of the first housing structure 210 and a second portion 220b of the second housing structure 220 that does not correspond to the sensor area 224 and that is parallel to the folding axis A. In this case, the second width w2 may be greater than the first width w1. In other words, the first portion 210a of the first housing structure 210 and the first portion 220a of the second housing structure 220 that have asymmetrical shapes may form the first width w1 of the recess, and the second portion 210b of the first housing structure 210 and the second portion 220b of the second housing structure 220 that have symmetrical shapes may form the second width w2 of the recess. The first portion 220a and the second portion 220b of the second housing structure 220 may have different distances from the folding axis A. The recess may have a plurality of widths depending on the form of the sensor area 224 or the portions of the first housing structure 210 and the second housing structure 220 that have asymmetrical shapes.

At least part of the first housing structure 210 and the second housing structure 220 may be formed of a metallic material or a non-metallic material that has a stiffness selected to support the display 100.

The sensor area 224 may be formed to have a predetermined area adjacent to one corner of the second housing structure 220. However, the arrangement, shape, and size of the sensor area 224 are not limited to the illustrated example. For example, the sensor area 224 may be provided in another corner of the second housing structure 220 or in any area between an upper corner and a lower corner of the second housing structure 220. Parts embedded in the electronic device 10 to perform various functions may include various sensors and may be exposed on the front surface of the electronic device 10 though the sensor area 224 or through one or more openings formed in the sensor area 224. The sensors may include at least one of a front camera, a receiver, and a proximity sensor.

The first back cover 280 may be disposed on one side of the folding axis A on the rear surface of the electronic device 10. The first back cover 280 may have a substantially rectangular periphery surrounded by the first housing structure 210. Similarly, the second back cover 290 may be disposed on an opposite side of the folding A on the rear surface of the electronic device 10, and the periphery of the second back cover 290 may be surrounded by the second housing structure 220.

In FIG. 1A, the first back cover 280 and the second back cover 290 may have substantially symmetrical shapes with respect to the folding A. However, the first back cover 280 and the second back cover 290 may have various shapes. In addition, the first back cover 280 may be integrally formed with the first housing structure 210, and the second back cover 290 may be integrally formed with the second housing structure 220.

The first back cover 280, the second back cover 290, the first housing structure 210, and the second housing structure 220 may form a space in which various parts, such as a printed circuit board (PCB) or a battery of the electronic device 10, are disposed. One or more parts may be disposed or visually exposed on the rear surface of the electronic device 10. At least part of a sub-display 190 may be visually exposed through a first rear area 282 of the first back cover 280. One or more parts or sensors may be visually exposed through a second rear area 292 of the second back cover 290. The sensors may include a proximity sensor and/or a rear camera.

Figure 1B:
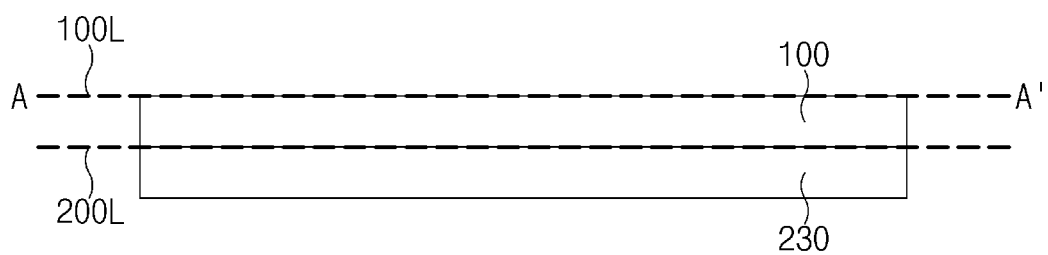
FIG. 1B illustrates a section of the electronic device according to an embodiment.

FIG. 1B illustrates a section of the electronic device according to an embodiment, and is a sectional view taken along line A-A' of FIG. 1A. In FIG. 1B, the foldable housing 200 may include the first housing structure 210 and the second housing structure 220 that is foldable relative to the first housing structure 210 about a first axis 200L. The foldable housing 200 is foldable about the first axis 200L, which may be a folding axis or a hinge. The hinge cover 230 may be disposed between the first housing structure 210 and the second housing structure 220 and may be configured to hide the first axis 200L.

In FIGS. 1A and 1B, the display 100 may include a first area 101 disposed on the first portion 210a in the first housing structure 210, a second area 102 disposed on the second portion 220b in the second housing structure 220, and a folding area 103. The first area 101 may be folded relative to the second area 102 about a second axis 100L parallel to the first axis 200L. The second axis 100L, also referred to as axis A-A', may be included in the folding area 103, and the display 100 may be folded about the second axis 100L.

Figure 2:
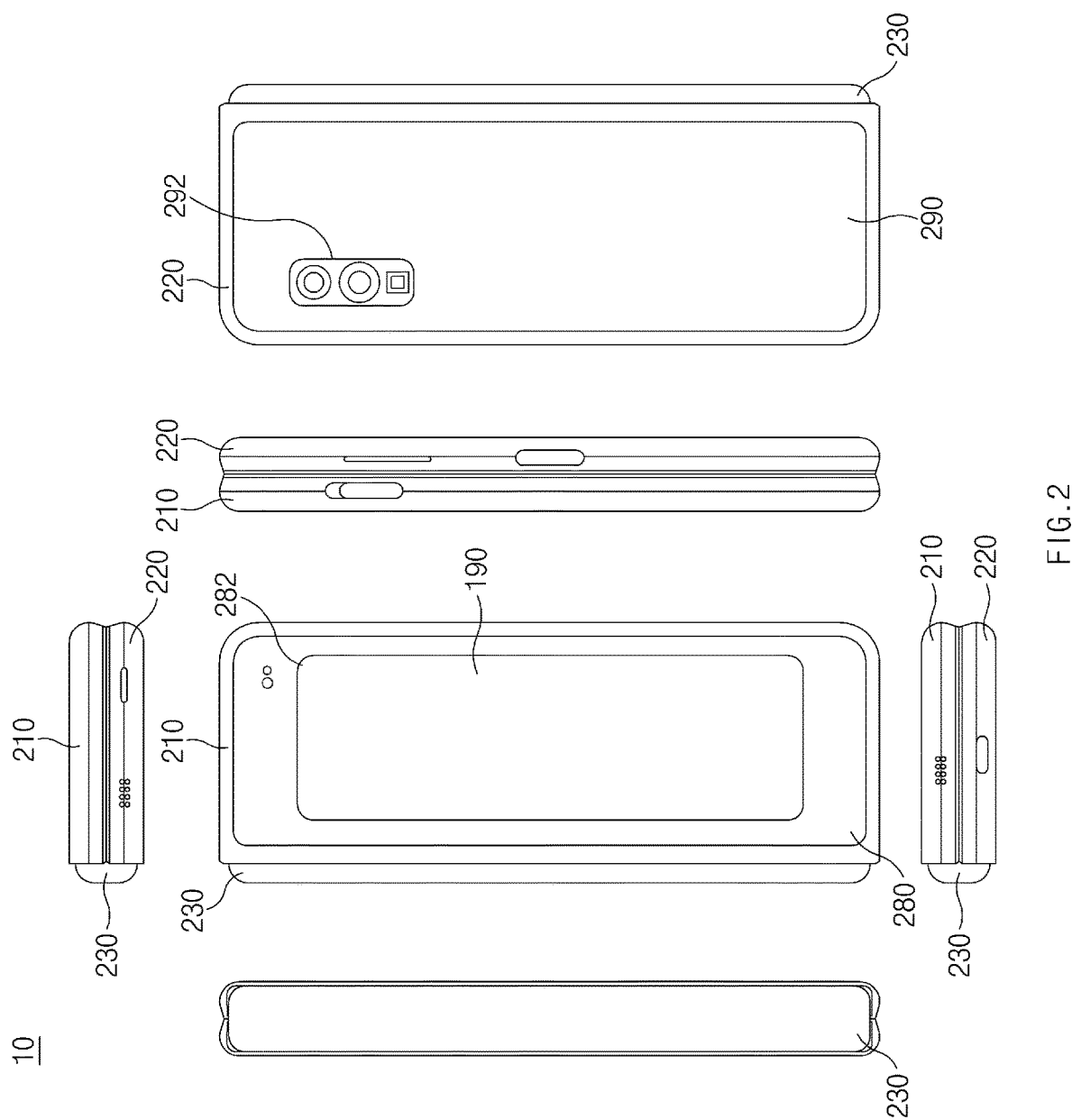
FIG. 2 illustrates a folded state of the electronic device according to an embodiment.

FIG. 2 illustrates a folded state of the electronic device according to an embodiment.

Referring to FIG. 2, the hinge cover 230 may be disposed between the first housing structure 210 and the second housing structure 220 and may be configured to hide a hinge structure. The hinge cover 230 may be hidden by a portion of the first housing structure 210 and a portion of the second housing structure 220, or may be exposed to the outside, depending on a flat or folded state of the electronic device 10.

When the electronic device 10 is in a flat state as illustrated in FIG. 1A, the hinge cover 230 may not be exposed by being hidden by the first housing structure 210 and the second housing structure 220. When the electronic device 10 is in a fully folded state as illustrated in FIG. 2, the hinge cover 230 may be exposed to the outside from between the first housing structure 210 and the second housing structure 220. When the electronic device 10 is in an intermediate state in which the first housing structure 210 and the second housing structure 220 are folded with a certain angle, the hinge cover 230 may be partially exposed to the outside from between the first housing structure 210 and the second housing structure 220. However, in this case, the exposed area may be smaller than that when the electronic device 10 is in the fully folded state. The hinge cover 230 may include a curved surface.

The display 100 may be disposed on the space formed by the foldable housing 200. The display 100 may be seated on the recess formed by the foldable housing 200 and may form almost the entire front surface of the electronic device 10.

Accordingly, the front surface of the electronic device 10 may include the display 100, and a partial area of the first housing structure 210 and a partial area of the second housing structure 220 that are adjacent to the display 100. The rear surface of the electronic device 10 may include the first back cover 280, a partial area of the first housing structure 210 that is adjacent to the first back cover 280, the second back cover 290, and a partial area of the second housing structure 220 that is adjacent to the second back cover 290.

The display 100 may have at least a partial area that is able to be deformed into a flat surface or a curved surface. The display 100 may include the folding area 103, the first area 101 disposed on the left side of the folding area 103, and the second area 102 disposed on the right side of the folding area 103, as illustrated in FIG. 1A.

The areas of the display 100 illustrated in FIG. 1A may be divided into a plurality of areas depending on the structure or function of the display 100. For example, the areas of the display 100 may be divided from each other by the folding area 103 extending parallel to the y-axis or by the folding axis A. Alternatively, the display 100 may be divided into areas with respect to a folding area parallel to the x-axis or a folding axis parallel to the x-axis.

The first area 101 and the second area 102 may have shapes that are entirely symmetric to each other with respect to the folding area 103. Unlike the first area 101, the second area 102 may include a notch that is cut according to the presence of the sensor area 224. However, in the other area, the second area 102 may be symmetric to the first area 101. In other words, the first area 101 and the second area 102 may include a portion having a symmetrical shape and a portion having an asymmetrical shape.

When the electronic device 10 is in a flat state as illustrated in FIG. 1A, the first housing structure 210 and the second housing structure 220 may be arranged to face the same direction while forming an angle of 180 degrees therebetween. The surface of the first area 101 of the display 100 and the surface of the second area 102 thereof may face the same forward direction of the electronic device while forming an angle of 180 degrees therebetween. The folding area 103, together with the first area 101 and the second area 102, may form the same plane.

When the electronic device 10 is in a folded state as illustrated in FIG. 2, the first housing structure 210 and the second housing structure 220 may be arranged to face each other. The surface of the first area 101 of the display 100 and the surface of the second area 102 thereof may face each other while forming a narrow angle (e.g., an angle between 0 degrees and 10 degrees). At least part of the folding area 103 may be formed of a curved surface having a predetermined curvature.

When the electronic device 10 is in an intermediate state, the first housing structure 210 and the second housing structure 220 may be arranged to form a certain angle therebetween. The surface of the first area 101 of the display 100 and the surface of the second area 102 thereof may form an angle that is wider than the angle in the folded state and is narrower than the angle in the flat state. At least part of the folding area 103 may be formed of a curved surface having a predetermined curvature that is smaller than the curvature in the folded state.

Figure 3:
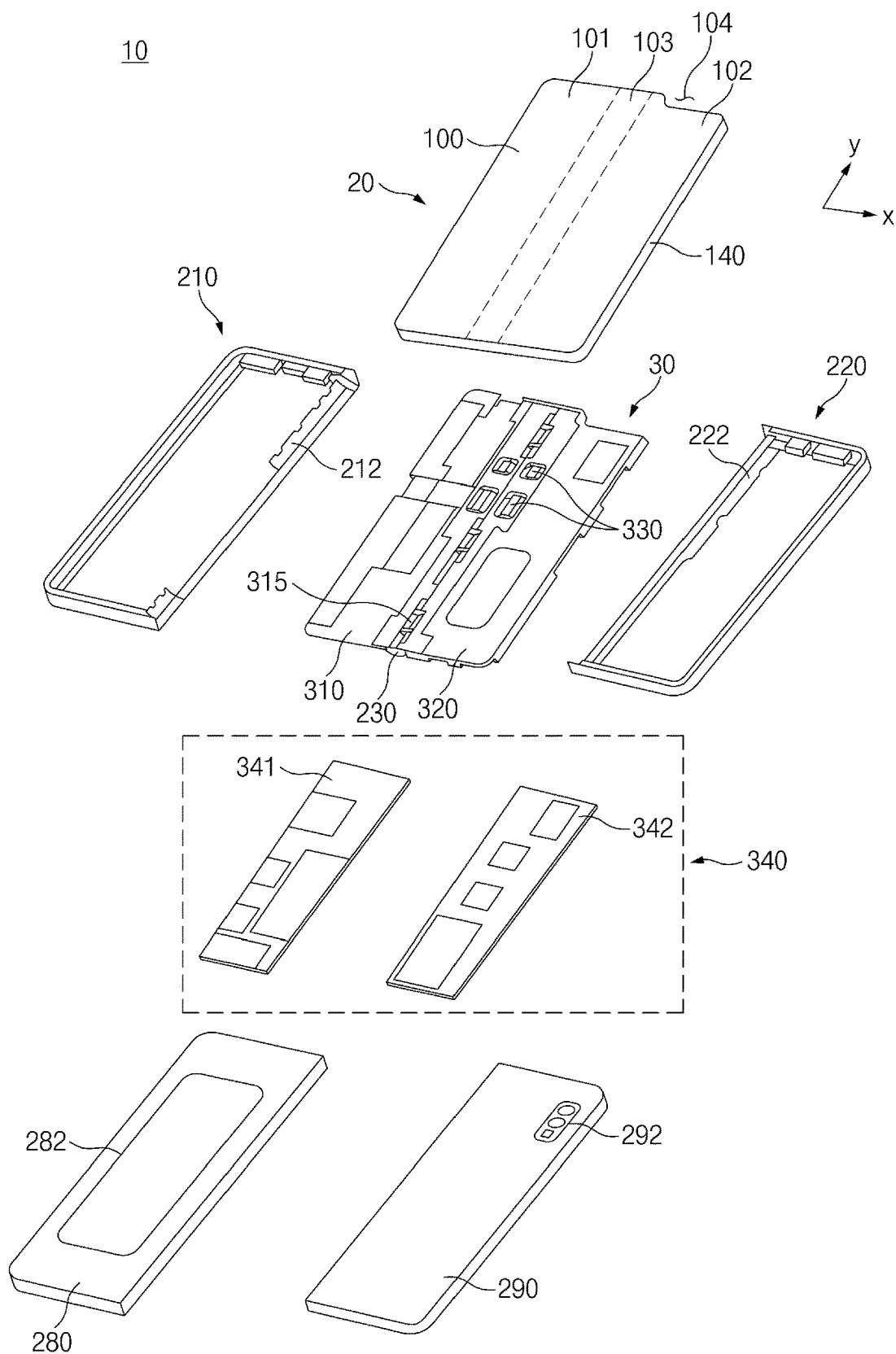
FIG. 3 is an exploded perspective view of the electronic device according to an embodiment.

FIG. 3 is an exploded perspective view of the electronic device according to an embodiment.

Referring to FIG. 3, the electronic device 10 may include a display unit 20 which is also referred to herein as a display module or a display assembly, a bracket assembly 30, a circuit board 340, the first housing structure 210, the second housing structure 220, the first back cover 280, and the second back cover 290.

The display unit 20 may include the display 100 and one or more plates or layers 140 on which the display 100 is seated. The plates 140 may be disposed between the display 100 and the bracket assembly 30. The display 100 may be disposed on at least part of one surface of the plates 140 (e.g., the upper surface with respect to FIG. 3). The plates 140 may be formed in a shape corresponding to the display 100. For example, partial areas of the plates 140 may be formed in a shape corresponding to a notch 104 of the display 100.

The bracket assembly 30 may include a first bracket 310, a second bracket 320, a hinge structure 315 disposed between the first bracket 310 and the second bracket 320, the hinge cover 230 that covers the hinge structure 315 when viewed from the outside, and wiring members 330 (e.g., flexible printed circuits (FPCs)) that traverse the first bracket 310 and the second bracket 320.

The bracket assembly 30 may be disposed between the plates 140 and the circuit board 340. The first bracket 310 may be disposed between the first area 101 of the display 100 and a first circuit board 341. The second bracket 320 may be disposed between the second area 102 of the display 100 and a second circuit board 342.

The wiring members 330 and at least part of the hinge structure 315 may be disposed inside the bracket assembly 30. The wiring members 330 may be arranged in the x-axis direction across the first bracket 310 and the second bracket 320. The wiring members 330 may be arranged in the x-axis direction that is perpendicular to the folding axis (e.g., the y-axis) of the folding area 103 of the electronic device 10.

The circuit board 340, as mentioned above, may include the first circuit board 341 disposed on one side of the first bracket 310 and the second circuit board 342 disposed on one side of the second bracket 320. The first circuit board 341 and the second circuit board 342 may be disposed in the space that is formed by the bracket assembly 30, the first housing structure 210, the second housing structure 220, the first back cover 280, and the second back cover 290. Parts for implementing various functions of the electronic device 10 may be mounted on the first circuit board 341 and the second circuit board 342.

The first housing structure 210 and the second housing structure 220 may be assembled together so as to be coupled to opposite sides of the bracket assembly 30 when the display unit 20 is coupled to the bracket assembly 30. As will be described below, the first housing structure 210 and the second housing structure 220 may be coupled with the bracket assembly 30 by sliding on the opposite sides of the bracket assembly 30.

The first housing structure 210 may include a first rotation support surface 212, and the second housing structure 220 may include a second rotation support surface 222 corresponding to the first rotation support surface 212. Each of the first rotation support surface 212 and the second rotation support surface 222 may include a curved surface corresponding to the curved surface included in the hinge cover 230.

When the electronic device 10 is in a flat state, the first rotation support surface 212 and the second rotation support surface 222 may cover the hinge cover 230, and the hinge cover 230 may not be exposed, or may be minimally exposed, on the rear surface of the electronic device 10. When the electronic device 10 is in a folded state, the first rotation support surface 212 and the second rotation support surface 222 may rotate along the curved surfaces included in the hinge cover 230, and the hinge cover 230 may be maximally exposed on the rear surface of the electronic device 10.

Figure 4:
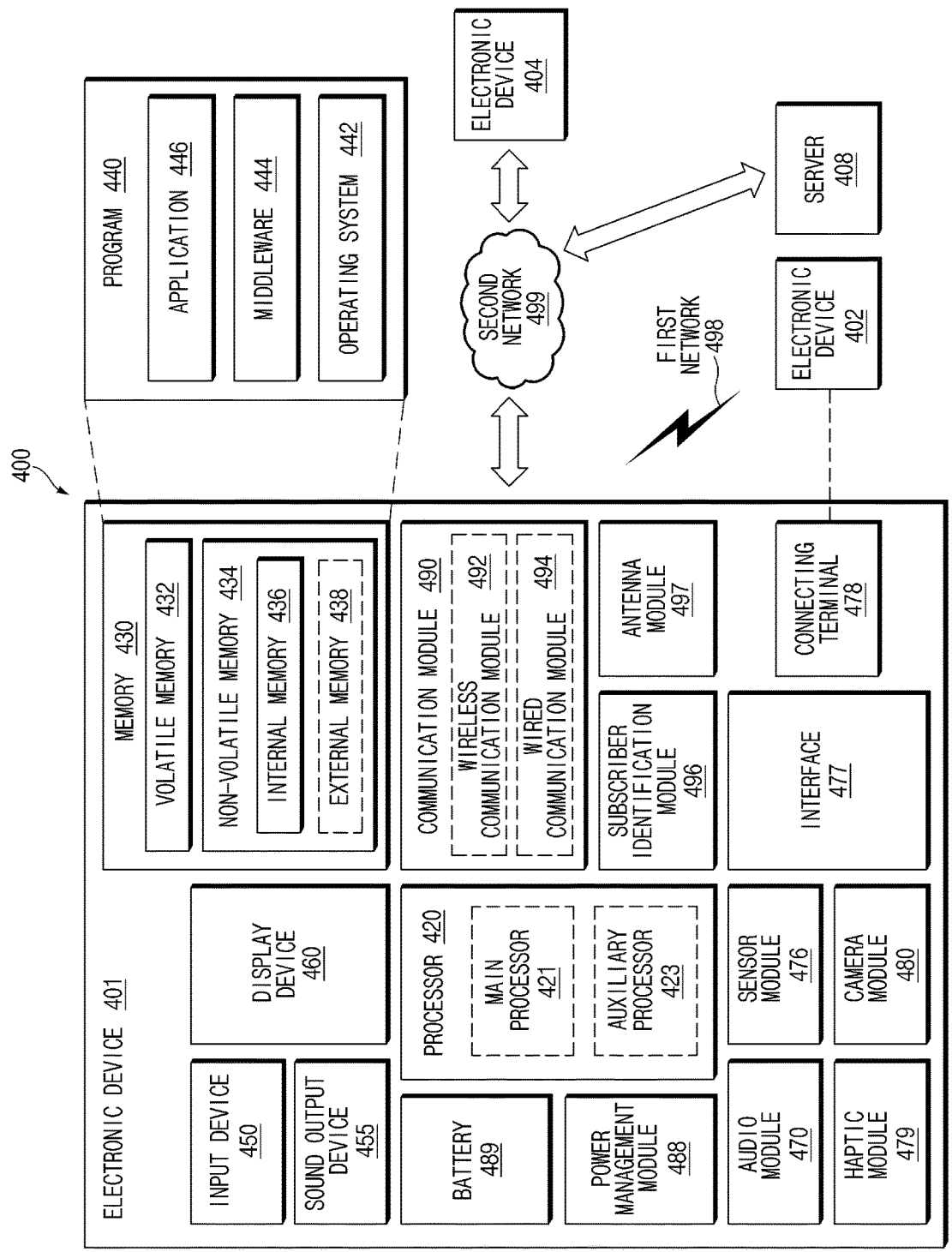
FIG. 4 is a block diagram of an electronic device in a network environment according to an embodiment.

FIG. 4 is a block diagram illustrating an electronic device 401 in a network environment 400 according to an embodiment.

Referring to FIG. 4, the electronic device 401 may communicate with an electronic device 402 via a first network 498 (e.g., a short-range wireless communication network), or an electronic device 404 or a server 408 via a second network 499 (e.g., a long-range wireless communication network). The electronic device 401 may communicate with the electronic device 404 via the server 408. The electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) card 496, and an antenna module 497. At least one of the components may be omitted from the electronic device 401, or one or more other components may be added in the electronic device 401. Some of the components may be implemented as single integrated circuitry. The sensor module 476) may be implemented as embedded in the display device 460.

The processor 420 may execute a program 440 to control at least one other hardware or software component of the electronic device 401 coupled with the processor 420, and may perform various data processing or computation. For example, the processor 420 may load a command or data received from another component in volatile memory 432, process the command or the data stored in the volatile memory 432, and store resulting data in non-volatile memory 434. The processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or to be specific to a function. The auxiliary processor 423 may be implemented as separate from, or as part of the main processor 421.

The auxiliary processor 423 may control at least some of functions or states related to at least one component among the components of the electronic device 401, instead of the main processor 421 while the main processor 421 is in an inactive (e.g., sleep) state, or together with the main processor 421 while the main processor 421 is in an active state (e.g., executing an application). The auxiliary processor 423 (e.g., an image signal processor or a communication processor) may be implemented as part of another component functionally related to the auxiliary processor 423.

The memory 430 may store data used by at least one component of the electronic device 401, such as the program 440 and input data or output data for a command related to the program 440. The memory 430 may include the volatile memory 432 and the non-volatile memory 434.

The program 440 may be stored in the memory 430 as software, and may include an operating system (OS) 442, middleware 444, and an application 446.

The input device 450 may receive a command or data to be used by another component of the electronic device 401, from the outside (e.g., a user) of the electronic device 401. The input device 450 may include a microphone, a mouse, a keyboard, or a digital pen (e.g., a stylus pen).

The sound output device 455 may output sound signals to the outside of the electronic device 401. The sound output device 455 may include a speaker or a receiver. The speaker may be used for general purposes, such as playing multimedia data or recordings, and the receiver may be used for an incoming calls. The receiver may be implemented as separate from, or as part of the speaker.

The display device 460 may visually provide information to the user of the electronic device 401. The display device 460 may include a display, a hologram device, or a projector and control circuitry to control a corresponding one of the display, hologram device, and projector. The display device 460 may include touch circuitry adapted to detect a touch, or a pressure sensor adapted to measure the intensity of force incurred by the touch.

The audio module 470 may convert a sound into an electrical signal and vice versa. The audio module 470 may obtain the sound via the input device 450, or output the sound via the sound output device 455 or a headphone of an external electronic device 402 directly or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. The sensor module 476 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device 402 directly or wirelessly. The interface 477 may include a high definition multimedia interface (HDMI), a universal serial bus (USB) interface, a secure digital (SD) card interface, or an audio interface.

A connecting terminal 478 may include a connector via which the electronic device 401 may be physically connected with the external electronic device 402. The connecting terminal 478 may include a HDMI connector, a USB connector, a SD card connector, or a headphone connector.

The haptic module 479 may convert an electrical signal into a mechanical stimulus (e.g., a vibration or a movement) or electrical stimulus which may be recognized by a user via tactile or kinesthetic sensation. The haptic module 479 may include a motor, a piezoelectric element, or an electric stimulator.

The camera module 480 may capture a still image or moving images. The camera module 480 may include one or more lenses, image sensors, image signal processors, or flashes.

The power management module 488 may manage power supplied to the electronic device 401, and may be implemented as at least part of a power management integrated circuit (PMIC).

The battery 489 may supply power to at least one component of the electronic device 401. The battery 489 may include a primary cell which is not rechargeable, a secondary cell which is rechargeable, or a fuel cell.

The communication module 490 may support establishing a wired communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 and supports wired or wireless communication. The communication module 490 may include a wireless communication module 492 (e.g., a cellular communication module, a short-range wireless communication module, or a global navigation satellite system (GNSS) communication module) and a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, Wi-Fi direct, or infrared data association (IrDA)) or the second network 499 (e.g., a long-range communication network, such as a cellular network, the Internet, or a computer network (e.g., LAN or wide area network (WAN)). These communication modules may be implemented as a single chip, or as multi chips separate from each other. The wireless communication module 492 may identify and authenticate the electronic device 401 in a communication network, such as the first network 498 or the second network 499, using subscriber information (e.g., international mobile subscriber identity (IMSI)) stored in the SIM card 496.

The antenna module 497 may transmit or receive a signal or power to or from the external electronic device of the electronic device 401. The antenna module 497 may include an antenna including a radiating element composed of a conductive material or a conductive pattern formed in or on a PCB. The antenna module 497 may include a plurality of antennas, in which case at least one antenna appropriate for a communication scheme used in the communication network, such as the first network 498 or the second network 499, may be selected by the communication module 490 from the plurality of antennas. The signal or the power may then be transmitted or received between the communication module 490 and the external electronic device via the selected at least one antenna. Another component (e.g., a radio frequency integrated circuit (RFIC)) other than the radiating element may be additionally formed as part of the antenna module 497.

At least some of the above-described components may be coupled mutually and communicate commands or data therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 401 and the external electronic device 404 via the server 408 coupled with the second network 499. Each of the electronic devices 402 and 404 may be of a same type as, or a different type, from the electronic device 401. All or some of operations to be executed at the electronic device 401 may be executed at one or more of the external electronic devices 402, 404, or 408. If the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or service related to the request, and transfer an outcome of the performing to the electronic device 401. The electronic device 401 may provide the outcome, with or without further processing of the outcome, as at least part of a reply to the request. To that end, a cloud, distributed, or client-server computing technology may be used, for example.

Figure 5A:
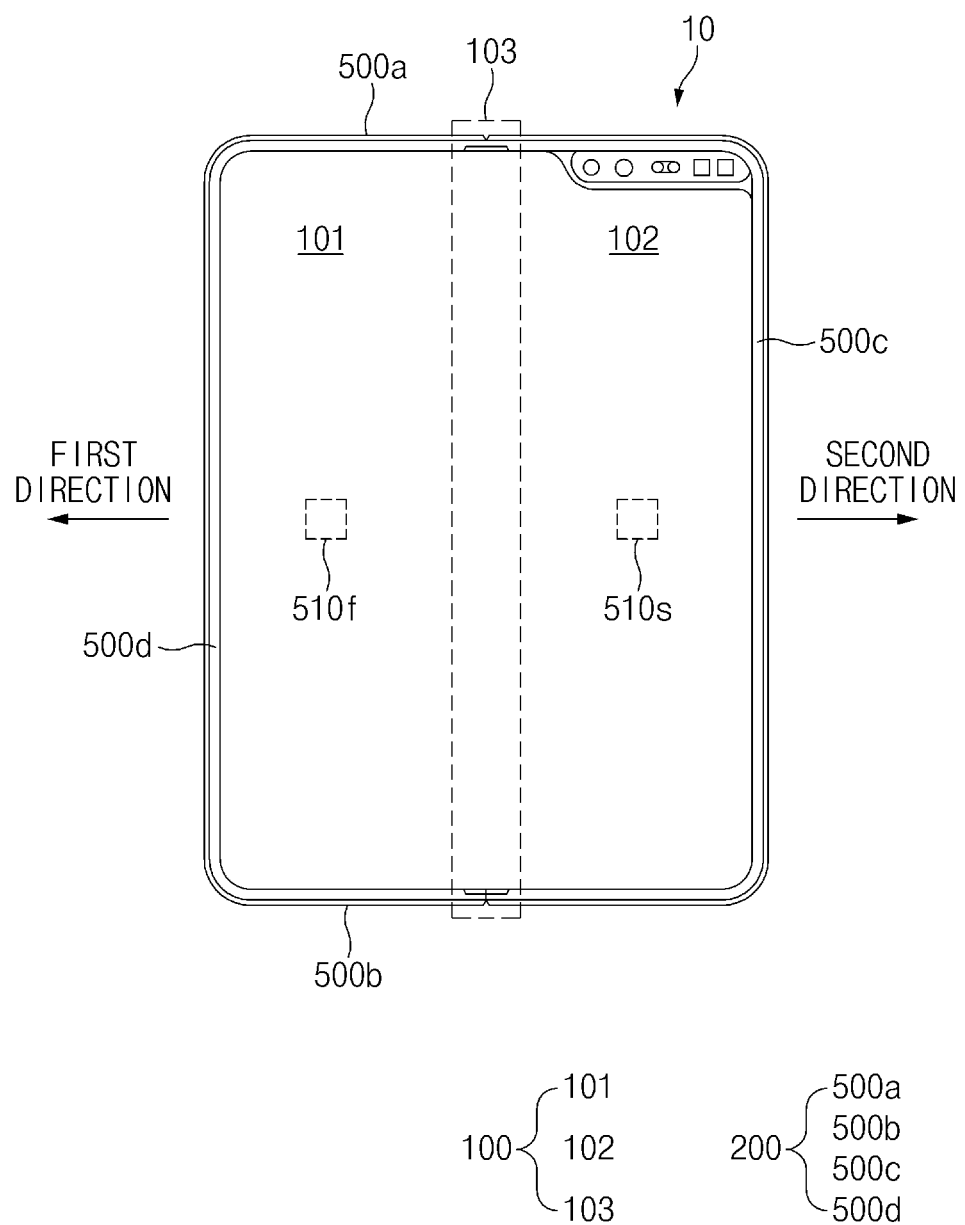
FIG. 5A illustrates the front side of the electronic device according to an embodiment.
Figure 5B:
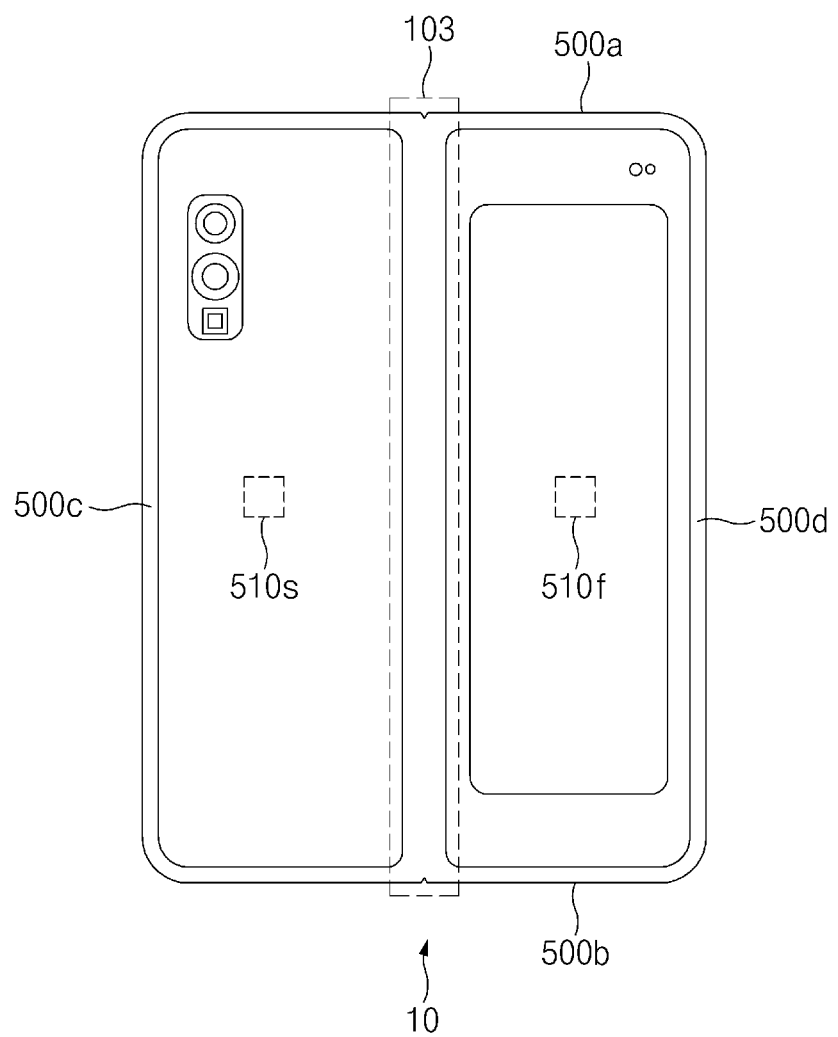
FIG. 5B illustrates the rear side of the electronic device according to an embodiment.

FIG. 5A illustrates the front side of the electronic device according to an embodiment. FIG. 5B illustrates the rear side of the electronic device according to an embodiment.

Referring to FIGS. 5A and 5B, the foldable housing 200 includes a first edge 500a, a second edge 500b opposite the first edge 500a, a third edge 500c connecting one end of the first edge 500a and one end of the second edge 500b, and a fourth edge 500d connecting an opposite end of the first edge 500a and an opposite end of the second edge 500b. The first edge 500a and the second edge 500b may include a cut-off portion such that the electronic device 10 is foldable about the folding area 103.

In FIGS. 5A and 5B, the display 100 may be folded about the folding area 103. The first area 101 of the display 100 may be located in a first direction with respect to the folding area 103, and the second area 102 may be located in a second direction with respect to the folding area 103. Accordingly, the first area 101 and the second area 102 may face each other when the electronic device 100 is in a folded state.

The electronic device 10 includes a first sensor 510f disposed in the first area 101 and a second sensor 510s disposed in the second area 102. The first sensor 510f and the second sensor 510s may include a motion sensor, which may be an acceleration sensor and/or a gyro sensor.

The first sensor 510f may obtain data related to the first area 101, such as the posture, rotation angle, and/or rotational direction of the first area 101. The posture of the first area 101 may refer to a degree to which the first area 101 is twisted with respect to the direction of gravity. The second sensor 510s may obtain data related to the second area 102, such as the posture, rotation angle, and/or rotational direction of the second area 102. The posture of the second area 102 may refer to a degree to which the second area 102 is twisted with respect to the direction of gravity. In this disclosure, description of the first sensor 510f may be similarly applied to the second sensor 510s.

The contents described above with reference to FIGS. 1A to 5B may be identically applied to components having the same reference numerals as the components included in the electronic device 10 illustrated in FIGS. 1A to 5B.

Figure 6A:
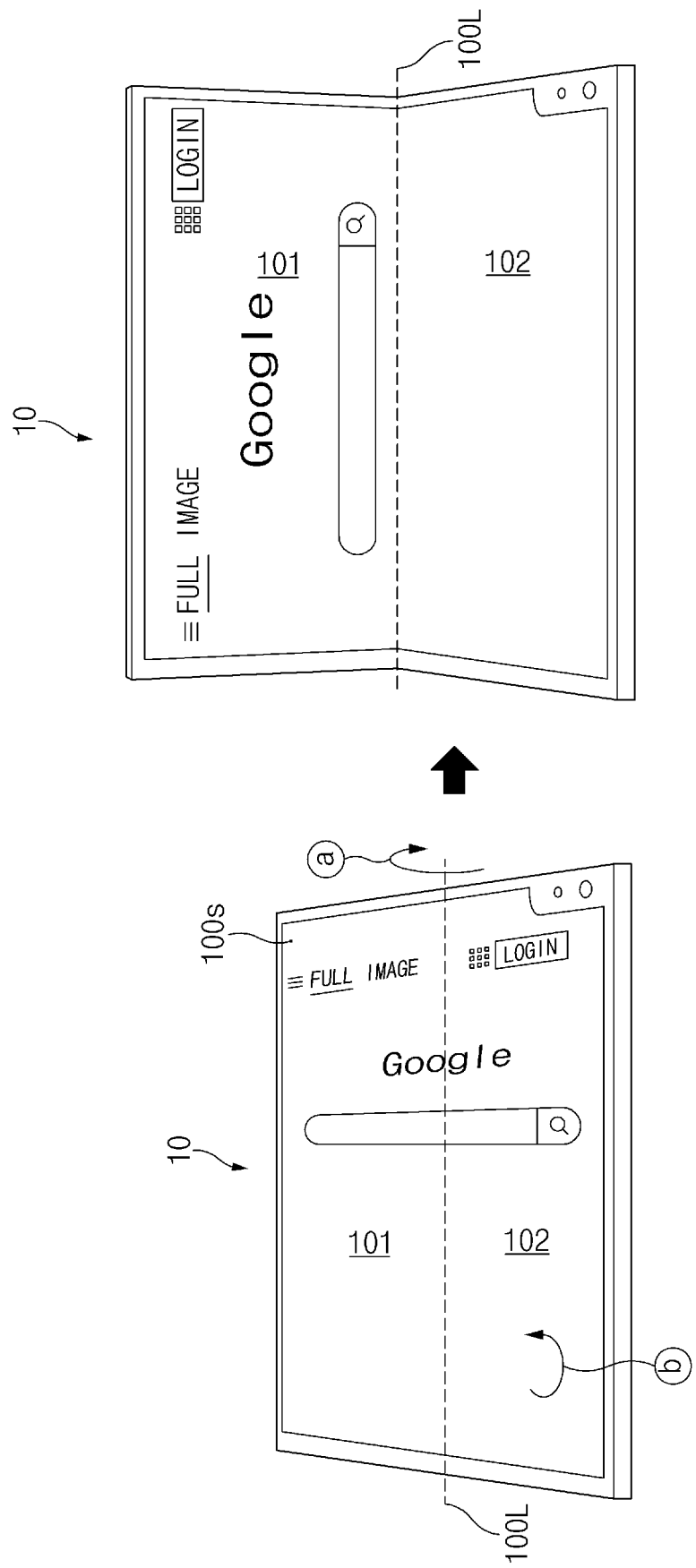
FIG. 6A illustrates an operation of the electronic device according to an embodiment.

FIG. 6A illustrates an operation of the electronic device according to an embodiment.

Referring to FIG. 6A, the electronic device 10 may execute at least one of the applications stored in the memory 430. A user interface of the application may be output through the first area 101 and the second area 102 of the display 100. For example, the electronic device 10 may execute an Internet browser in response to a user input and may output a user interface of the Internet browser through the first area 101 and the second area 102 of the display 100.

When the user interface of the application is output through the display 100, the electronic device 10 may detect the area in which a starting point 100s is located. For example, when the user interface of the Internet browser is output through the display 100, the starting point 100s may refer to the location where the user interface of the Internet browser starts to be output through the display 100. That is, the starting point 100s may be one of the four corners of the display 100 and may be located at the coordinates (0, 0). In another example, the starting point 100s may refer to the position of the pixel that first outputs an application execution screen among the pixels included in the display 100.

The electronic device 10 may obtain data related to the area in which the starting point 100s is located, by using a motion sensor in the first housing structure 210 or the second housing structure 220 that includes the area in which the starting point 100s is located. For example, when the starting point 100s is located in the first area 101, the electronic device 10 may measure the posture, rotation angle, and rotational direction of the first area 101 using the first sensor 510f. In this case, the electronic device 10 may turn off the second sensor 510s. Even if the second sensor 510s is not turned off, the electronic device 10 may not use data measured by the second sensor 510s. In contrast, when the starting point 100s is located in the second area 102, the electronic device 10 may measure the posture, rotation angle, and rotational direction of the second area 102 using the second sensor 510s. In this case, the electronic device 10 may turn off the first sensor 510f. Even if the first sensor 510f is not turned off, the electronic device 10 may not use data measured by the first sensor 510f.

The electronic device 10 may rotate the user interface of the application, based on the data obtained from the motion sensor included in the housing structure that includes the area in which the starting point 100s is located. For example, as illustrated in FIG. 6A, when the starting point 100s is located in the first area 101 in a flat state and the first area 101 is folded through a predetermined angle or less in a direction "a", the electronic device 10 may rotate the user interface of the application on the display 100 in the counterclockwise direction "b". That is, the electronic device 10 may rotate the user interface of the application in a direction perpendicular to the existing output direction. In other words, the user interface of the application may be rotated depending on the folded state of the foldable electronic device 10. Accordingly, a user may control the user interface of the application without any additional operation.

In contrast, an electronic device in the related art may control an application user interface, only based on both data obtained by a first sensor and data obtained by a second sensor, which data may not agree with each other because the first sensor and the second sensor measure the postures, rotation angles, and rotational directions of a first area and a second area with respect to different axes. However, there is no mechanism for selecting the sensor data not in agreement with each other, preventing the electronic device in the related art from rotating the application user interface by accurately reflecting the user's intent.

In contrast, the electronic device 10 of the disclosure may measure the posture, rotation angle, and rotational direction of the first area 101 or the second area 102 using only the sensor in the area in which the starting point 100s is located. Accordingly, the electronic device 10 may rotate the user interface of the application depending on the user's intent.

Alternatively, the processor 420 may execute at least one of the applications stored in the memory 430. A user interface of the application may be output through the first area 101 and the second area 102 of the display 100. The electronic device 10 may execute an Internet browser in response to a user input and may output a user interface of the Internet browser through the first area 101 and the second area 102 of the display 100.

When the user interface of the application is output through the display 100, the electronic device 10 may detect the area in which a starting point 100s is located. When the electronic device 10 is changed from a flat state to an intermediate state when the area in which the starting point 100s is located is detected, the electronic device 10 may obtain data related to the area in which the starting point 100s is located, by using a sensor in the area in which the starting point 100s is located. For example, when the starting point 100s is located in the first area 101, the electronic device 10 may measure the posture, rotation angle, and rotational direction of the first area 101 using the first sensor 510f.

When the data related to the area in which the starting point 100s is located is greater in amount than or equal to a specified value, the electronic device 10 may move the user interface of the application to the area in which the starting point 100s is located, and may rotate the user interface of the application. For example, when the starting point 100s is located in the first area 101, the electronic device 10 may output the user interface of the application through the first area 101. In this case, the user interface of the application may not be output through the second area 102.

Figure 6B:
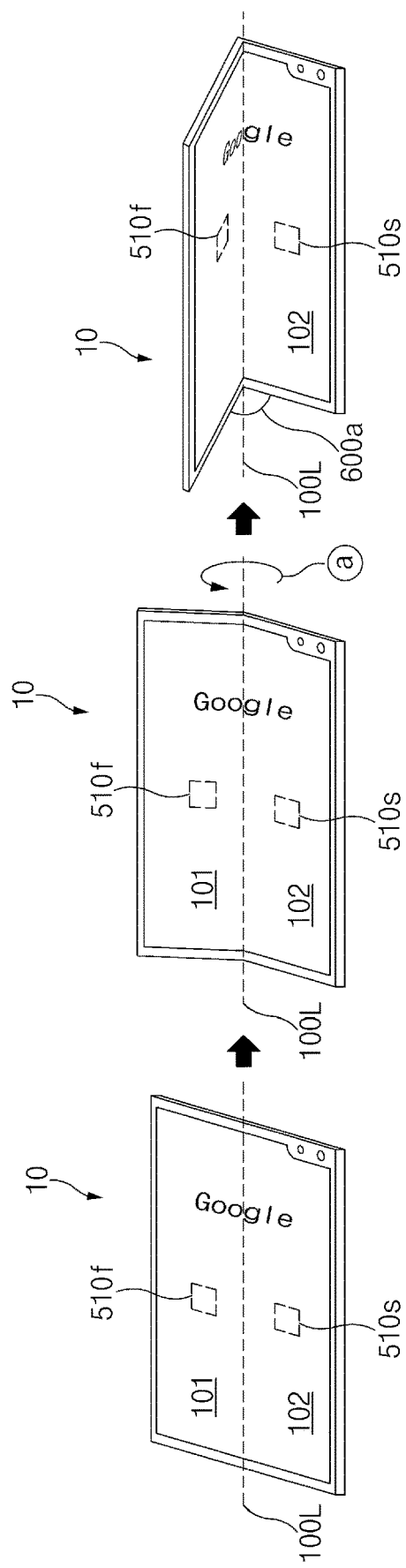
FIG. 6B illustrates an operation of the electronic device according to another embodiment.

FIG. 6B illustrates an operation of the electronic device according to another embodiment.

Referring to FIG. 6B, the electronic device 10 may detect, through the first sensor 510f and the second sensor 510s, whether the electronic device 10 makes contact with a specific surface (e.g., a bottom surface) in an intermediate state. For example, as illustrated in FIG. 6B, the second housing structure 220 of the electronic device 10 may make contact with the bottom surface in the intermediate state. In this case, the electronic device 10 may obtain the posture, rotation angle, and rotational direction of the first area 101 through the first sensor 510f that does not make contact with the bottom surface.

When the angle between the first area 101 and the second area 102 is within a specific range, the electronic device 10 may generate new data by merging data obtained by the first sensor 510f and the second sensor 510s. The electronic device 10 may obtain the posture, rotation angle, and rotational direction of the first area 101 through the first sensor 510f and may obtain the posture, rotation angle, and rotational direction of the second area 102 through the second sensor 510s. The electronic device 10 may generate new data by merging the posture, rotation angle, and rotational direction of the first area 101 and the posture, rotation angle, and rotational direction of the second area 102, and may control a user interface output on the first area 101 and the second area 102, based on the newly generated data.

Figure 7:
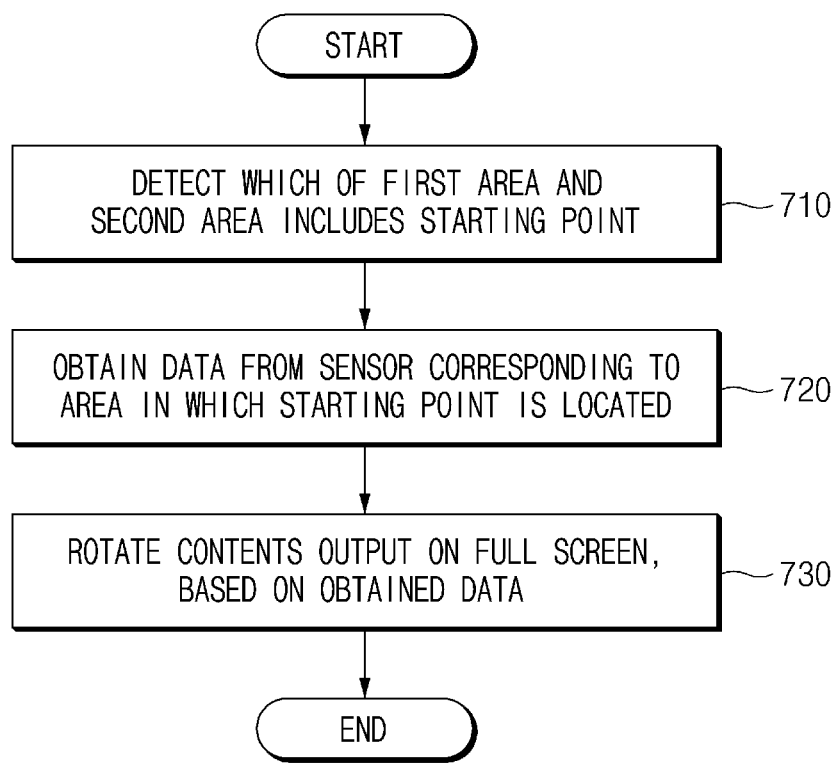
FIG. 7 is a flowchart illustrating the operation of the electronic device according to the embodiment of FIG. 6A.

FIG. 7 is a flowchart illustrating the operation of the electronic device according to the embodiment of FIG. 6A. Referring to FIG. 7, in step 710, the electronic device 10 may detect which of the first area 101 and the second area 102 includes the starting point 100s. For example, the display 100 may include a plurality of data lines and a plurality of gate lines, and pixels may be disposed at the intersections of the data lines and the gate lines. The starting point 100s may refer to the pixel that starts to output the user interface of the application among the pixels and may be generally located on a left side of the top of the user interface of the application.

In step 720, the electronic device 10 may obtain data related to the area in which the starting point 100s is located, from a sensor corresponding to the area in which the starting point 100s is located. For example, when the starting point 100s is located in the first area 101, the electronic device 10 may measure the posture, rotation angle, and rotational direction of the first area 101 using the first sensor 510f. In this case, the electronic device 10 may turn off the second sensor 510s. Even if the second sensor 510s is not turned off, the electronic device 10 may not use data measured by the second sensor 510s. In contrast, when the starting point 100s is located in the second area 102, the electronic device 10 may measure the posture, rotation angle, and rotational direction of the second area 102 using the second sensor 510s. In this case, the electronic device 10 may turn off the first sensor 510f. Even if the first sensor 510f is not turned off, the electronic device 10 may not use data measured by the first sensor 510f.

In step 730, the electronic device 10 may rotate contents output on the full screen based on the data obtained from the sensor corresponding to the area in which the starting point 100s is located. When the first area 101 is twisted (or rotated) through a predetermined angle or more in a specified direction, the electronic device 10 may rotate the user interface of the application that is output on the first area 101 and the second area 102. Accordingly, the user may control the application without any additional operation.

Figure 8:
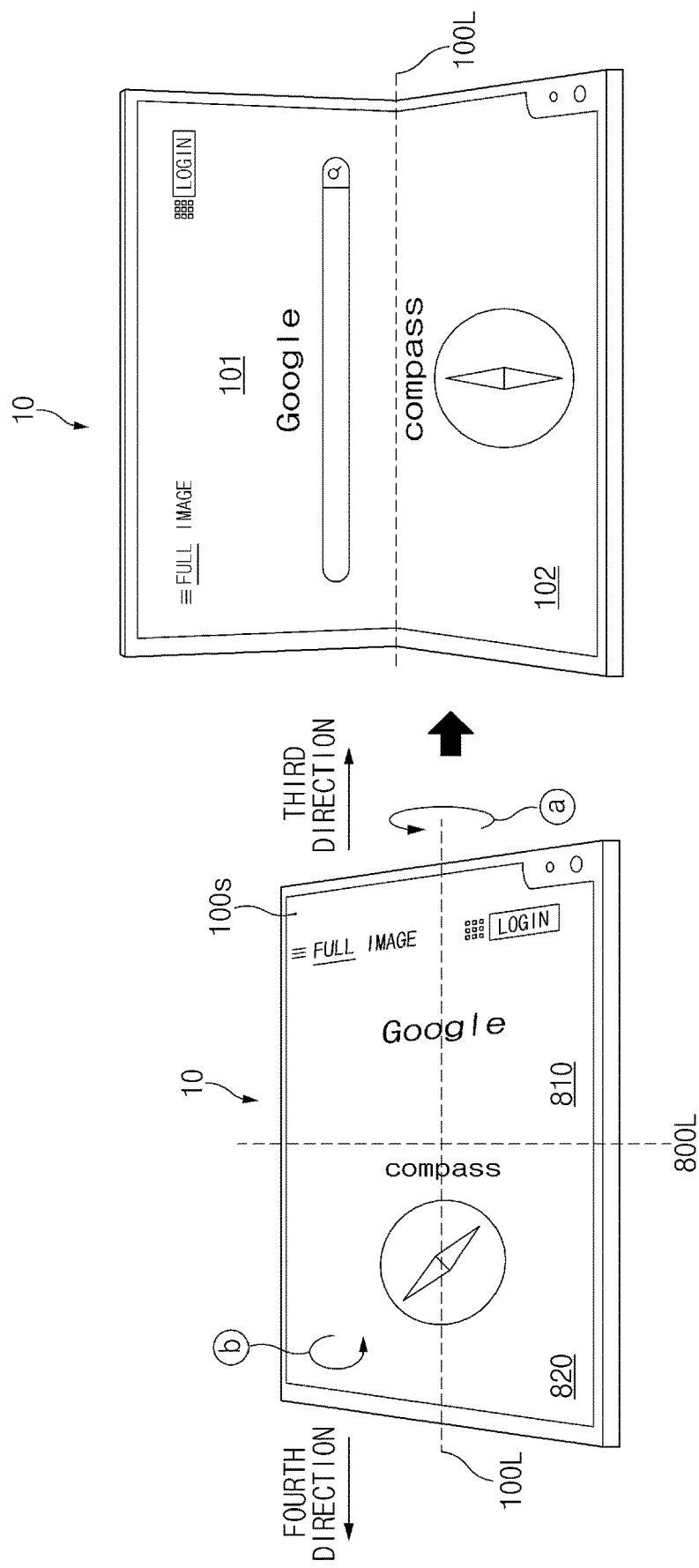
FIG. 8 illustrates an operation of the electronic device according to another embodiment.

FIG. 8 illustrates an operation of the electronic device according to another embodiment.

Referring to FIG. 8, the electronic device 10 may output user interfaces of different applications through an upper half screen 810 and a lower half screen 820. The upper half screen 810 may refer to the area of the foldable display 100 that is located in a third direction respect to a horizontal axis 800L, and the lower half screen 820 may refer to the area of the foldable display 100 that is located in a fourth direction with respect to the horizontal axis 800L. For example, the electronic device 10 may output a user interface of an Internet browser through the upper half screen 810 and may output a user interface of a navigation application through the lower half screen 820. The electronic device 10 may output the user interfaces of the different applications on the first area 101 and the second area 102 when data obtained by the first sensor 510f or the second sensor 510s is greater in amount than or equal to a specified value when the user interfaces of the different applications are output through the upper half screen 810 and the lower half screen 820. In this case, the electronic device 10 may rotate the user interfaces of the different applications. For example, when the first area 101 rotates in the direction a or when the electronic device 10 is changed from a flat state to an intermediate state, the electronic device 10 may rotate the user interface of the Internet browser and the user interface of the navigation application on the display 100 in the counterclockwise direction b. That is, the electronic device 10 may rotate the user interface of the Internet browser and the user interface of the navigation application on the display 100 in a direction perpendicular to the existing output direction.

Figure 9:
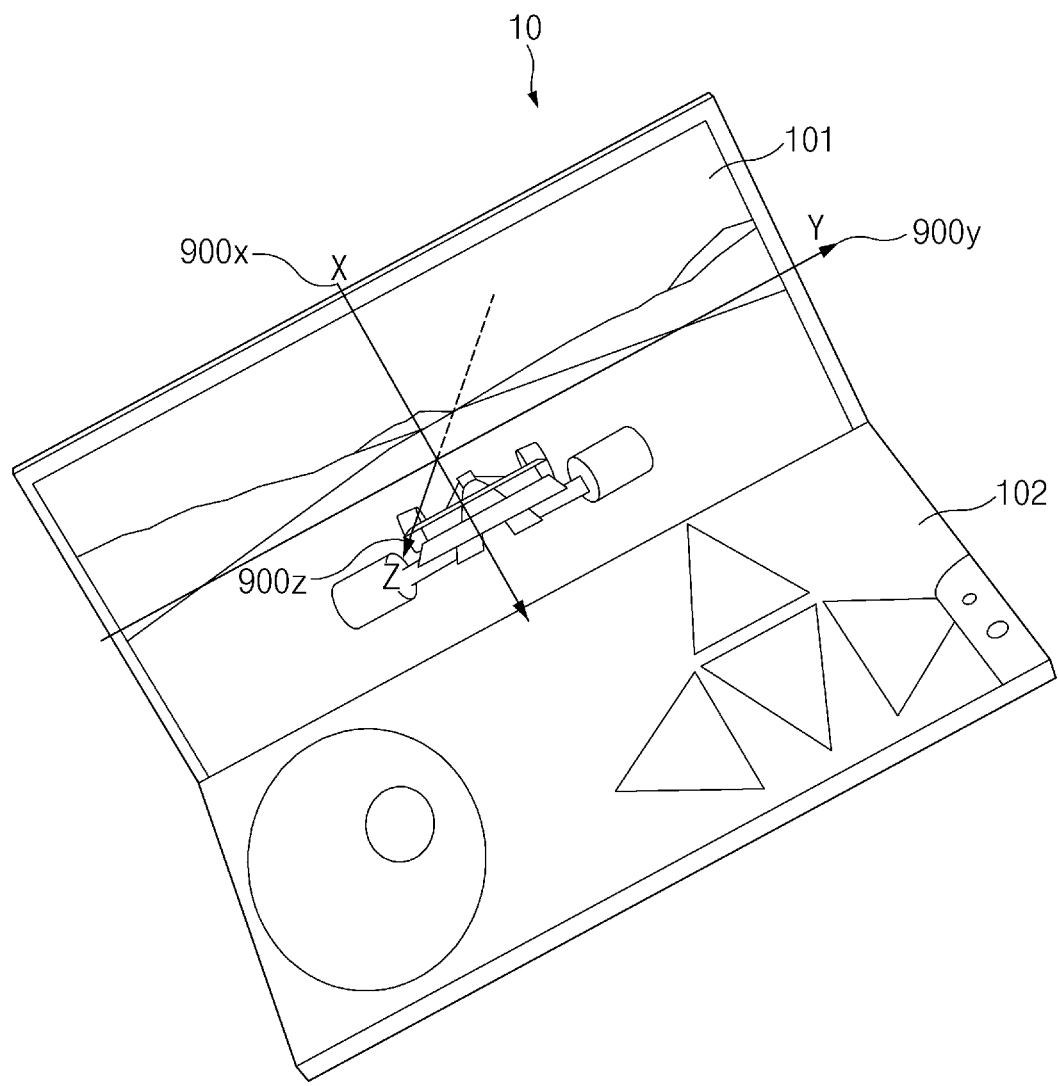
FIG. 9 illustrates an operation of the electronic device according to another embodiment.

FIG. 9 illustrates an operation of the electronic device according to another embodiment.

Referring to FIG. 9, the electronic device 10 may output a user interface of an application through the first area 101 and may output an application control screen through the second area 102. The electronic device 10 may output a game user interface through the first area 101 and may output a game control screen including direction keys through the second area 102, or vice versa.

When the electronic device 10 is changed from a flat state to an intermediate state, the electronic device 10 may obtain data related to the area in which the user interface of the application is output, by using a sensor in the area in which the user interface of the application is output. The electronic device 10 may control the user interface of the application, based on the data. For example, when the user interface of the application is output through the first area 101 and the application control screen is output through the second area 102, the electronic device 10 may measure the posture, rotational direction, and rotation angle of the first area 101 using the first sensor 510f. In this case, the electronic device 10 may turn off the second sensor 510s. Even if the second sensor 510s is not turned off, the electronic device 10 may not use data measured by the second sensor 510s.

In FIG. 9, the game user interface may be output through the first area 101, and the game control screen may be output through the second area 102. The electronic device 10 may rotate objects and icons that are output through the first area 101, based on the data obtained through the first sensor 510f. The electronic device 10 may rotate three axes 900x, 900y, and 900z that are output through the first area 101, based on the data obtained through the first sensor 510f.

The electronic device 10 may rotate the objects and the icons in the area in which the user interface of the application is output, by using the sensor in the area in which the user interface of the application is output. Accordingly, depending on the user's intent and/or the rotational direction of the user's hand, the electronic device 10 may rotate the objects and the icons in the area in which the user interface of the application is output.

Figure 10:
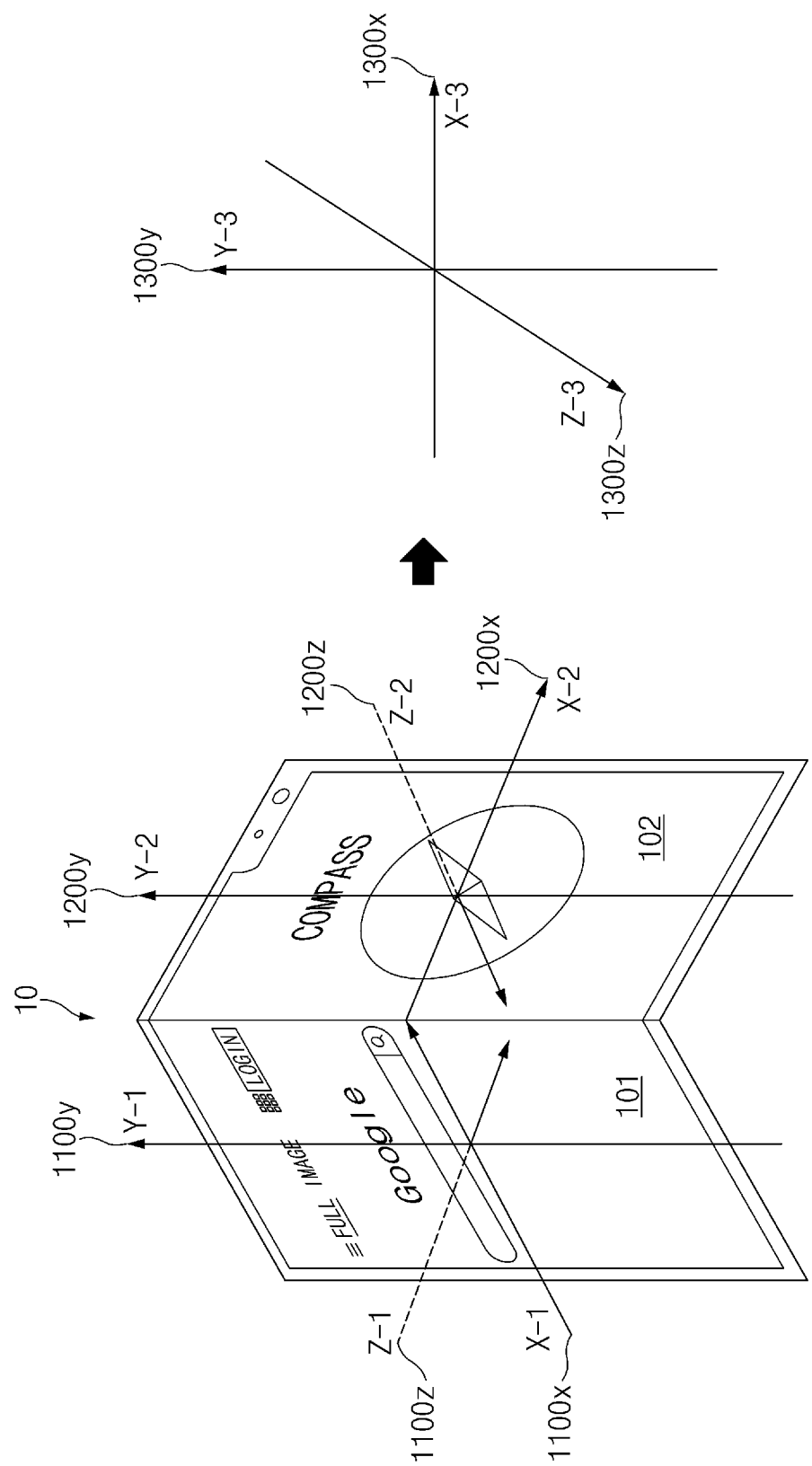
FIG. 10 illustrates an operation of the electronic device according to another embodiment.

FIG. 10 illustrates an operation of the electronic device according to another embodiment.

Referring to FIG. 10, the first area 101 may include three axes, and the second area 102 may include three axes different from the three axes of the first area 101. For example, the three axes of the first area 101 may include an x-1 axis 1100x, a y-1 axis 1100y, and a z-1 axis 1100z. The x-1 axis 1100x, the y-1 axis 1100y, and the z-1 axis 1100z may rotate together with the first area 101 when the first area 101 rotates, and the first sensor 510f may measure the rotational direction and rotation angle of the first area 101 with respect to the x-1 axis 1100x, the y-1 axis 1100y, and the z-1 axis 1100z. In addition, the three axes of the second area 102 may include an x-2 axis 1200x, a y-2 axis 1200y, and a z-2 axis 1200z. The x-2 axis 1200x, the y-2 axis 1200y, and the z-2 axis 1200z may rotate together with the second area 102 when the second area 102 rotates, and the second sensor 510s may measure the rotational direction and rotation angle of the second area 102 with respect to the x-2 axis 1200x, the y-2 axis 1200y, and the z-2 axis 1200z.

The electronic device 10 may generate an x-3 axis 1300x by merging the x-1 axis 1100x and the x-2 axis 1200x, may generate a y-3 axis 1300y by merging the y-1 axis 1100y and the y-2 axis 1200y, and may generate a z-3 axis 1300z by merging the z-1 axis 1100z and the z-2 axis 1200z. Based on the newly generated three axes 1300x, 1300y, and 1300z, the electronic device 10 may measure the rotational direction and rotation angle of the electronic device 10 and may output a user interface of an application.

The electronic device 10 may generate the three new axes 1300x, 1300y, and 1300z by merging the three axes of the first area 101 and the three axes of the second area 102 and may output the user interface of the application, based on the newly generated three axes 1300x, 1300y, and 1300z. Accordingly, the electronic device 10 may change the direction of the user interface of the application depending on the user's intent.

When the angle between the first area 101 and the second area 102 is narrower than or equal to a specified value, the electronic device 10 may not change the user interface that is output on the first area 101 and the second area 102. For example, when the user folds the electronic device 10 until the first area 101 and the second area 102 are superimposed on each other, the electronic device 10 may not change the user interface that is output on the first area 101 and the second area 102.

As described above, an electronic device 10 may include a housing 200 including a first housing structure 210 and a second housing structure 220 that is foldable relative to the first housing structure 210 about a first axis 200L, a foldable display 100 including a first portion 101 disposed in the first housing structure 210 and a second portion 102 disposed in the second housing structure 220, the first portion 101 being foldable relative to the second portion 102 about a second axis 100L parallel to the first axis 200L, a first motion sensor 510f disposed in the first housing structure 210, a second motion sensor 510s disposed in the second housing structure 220, a processor 420 located in the housing 200 and operatively coupled with the foldable display 100, the first motion sensor 510f, and the second motion sensor 510s, and a memory 430 operatively coupled with the processor 420.

The memory 430 may store instructions that, when executed, cause the processor 420 to output at least one user interface on the first portion 101 and/or the second portion 102 of the foldable display 100, receive first data from the first motion sensor 510f, receive second data from the second motion sensor 510s, and determine a direction of the user interface, based at least partly on the first data and/or the second data.

The instructions may further cause the processor 420 to select one of the first data or the second data, based at least partly on the first data and the second data and use the selected one of the first data or the second data when determining the direction of the user interface.

The instructions may further cause the processor 420 to select one of the first data or the second data, based at least partly on the output user interface and use the selected one of the first data or the second data when determining the direction of the user interface.

The instructions may further cause the processor 420 to determine an angle between the first portion 101 and the second portion 102, based at least partly on the first data and the second data and determine the direction of the user interface, based at least partly on the determined angle.

As described above, an electronic device 10 may include a housing 200 including a first edge 500a, a second edge 500b opposite the first edge 500a, a third edge 500c that connects one end of the first edge 500a and one end of the second edge 500b, a fourth edge 500d that connects an opposite end of the first edge 500a and an opposite end of the second edge 500b, a hinge 200L that connects the first edge 500a and the second edge 500b, a first housing structure 210 corresponding to an area between the third edge 500c and the hinge 200L, and a second housing structure 220 corresponding to an area between the fourth edge 500d and the hinge 200L, in which each of the first edge 500a and the second edge 500b is foldable about the hinge 200L, and when the first edge 500a and the second edge 500b are folded, the first housing structure 210 and the second housing structure 220 face each other, a foldable display 100 including a first area 101 extending from the hinge 200L in a first direction and a second area 102 extending from the hinge 200L in a second direction opposite to the first direction, a first sensor 510f disposed in the first housing structure 210, a second sensor 510s disposed in the second housing structure 220, a memory 430 that stores a plurality of applications, and a processor 420 that executes at least one of the plurality of applications.

The memory 430 may store instructions that, when executed, cause the processor 420 to detect which of the first area 101 and the second area 102 includes a starting point 100s at which a user interface of the executed application starts to be output on the foldable display 100, when the foldable display 100 is folded, receive data related to an area in which the starting point 100s is located, from one of the first sensor 510f and the second sensor 510s that corresponds to the area in which the starting point 100s is located, and determine whether to rotate the user interface in the area in which the starting point 100s is located, based on the data.

The instructions may further cause the processor 420 to turn off the other sensor corresponding to an area in which the starting point 100s is not located.

The instructions may further cause the processor 420 to rotate, on the foldable display 100 in a perpendicular direction, the user interface in the area in which the starting point 100s is located.

The foldable display 100 may include an upper half screen 810 extending in a third direction with respect to a horizontal axis 800L perpendicular to the hinge 200L and a lower half screen 820 extending in a fourth direction with respect to the horizontal axis 800L, and the instructions may cause the processor 420 to output user interfaces of different applications on the upper half screen 810 and the lower half screen 820 in response to a user input for dividing a screen.

The instructions may further cause the processor 420 to move the user interfaces of the different applications to the first area 101 and the second area 102 when the foldable display 100 is folded and rotate the user interfaces of the different applications on the first area 101 and the second area 102, respectively.

The instructions may further cause the processor 420 to maintain the user interface of the executed application when an angle between the first area 101 and the second area 102 is smaller than or equal to a specified value.

The first edge 500a may include a first cut-off portion, the second edge 500b may include a second cut-off portion, and the hinge 200L may extend from the first cut-off portion to the second cut-off portion.

The first edge 500a may be folded about the first cut-off portion, and the second edge 500b may be folded about the second cut-off portion.

The housing 200 may further include a first back cover 280 disposed on a surface opposite to the first area 101 and a second back cover 290 disposed on a surface opposite to the second area 102.

The instructions may further cause the processor 420 to measure three axes of the first area 101 that include an x-1 axis 1100x that is perpendicular to the third edge 500c and that extends toward the hinge 200L from the third edge 500c, a y-1 axis 1100y that is parallel to the third edge 500c and that extends toward the second edge 500b from the first edge 500a, and a z-1 axis 1100z that is perpendicular to the x-1 axis 1100x and the y-1 axis 1100y, and three axes of the second area 102 that include an x-2 axis 1200x that is perpendicular to the fourth edge 500d and that extends toward the hinge 200L from the fourth edge 500d, a y-2 axis 1200y that is parallel to the fourth edge 500d and that extends toward the second edge 500b from the first edge 500a, and a z-2 axis 1200z that is perpendicular to the x-2 axis 1200x and the y-2 axis 1200y.

The instructions may further cause the processor 420 to generate three new axes by merging the three axes of the first area 101 and the three axes of the second area 102 and rotate the user interface of the executed application, based on the newly generated three axes.

As described above, an electronic device 10 may include a housing 200 including a first edge 500a, a second edge 500b opposite the first edge 500a, a third edge 500c that connects one end of the first edge 500a and one end of the second edge 500b, a fourth edge 500d that connects an opposite end of the first edge 500a and an opposite end of the second edge 500b, a hinge 200L that connects the first edge 500a and the second edge 500b, a first housing structure 210 corresponding to an area between the third edge 500c and the hinge 200L, and a second housing structure 220 corresponding to an area between the fourth edge 500d and the hinge 200L, in which each of the first edge 500a and the second edge 500b is foldable about the hinge 200L, and when the first edge 500a and the second edge 500b are folded, the first housing structure 210 and the second housing structure 220 face each other, a foldable display 100 including a first area 101 extending from the hinge 200L in a first direction and a second area 102 extending from the hinge 200L in a second direction opposite to the first direction, a first sensor 510f disposed in the first housing structure 210, a second sensor 510s disposed in the second housing structure 220, a memory 430 that stores a plurality of applications, and a processor 420 that executes at least one of the plurality of applications.

The memory 430 may store instructions that, when executed, cause the processor 420 to measure three axes of the first area 101, based on data obtained by the first sensor 510f, in which the three axes of the first area 101 include an x-1 axis 1100x that is perpendicular to the third edge 500c and that extends toward the hinge 200L from the third edge 500c, a y-1 axis 1100y that is parallel to the third edge 500c and that extends toward the second edge 500b from the first edge 500a, and a z-1 axis 1100z that is perpendicular to the x-1 axis 1100x and the y-1 axis 1100y, measure three axes of the second area 102, based on data obtained by the second sensor 510s, in which the three axes of the second area 102 include an x-2 axis 1200x that is perpendicular to the fourth edge 500d and that extends toward the hinge 200L from the fourth edge 500d, a y-2 axis 1200y that is parallel to the fourth edge 500d and that extends toward the second edge 500b from the first edge 500a, and a z-2 axis 1200z that is perpendicular to the x-2 axis 1200x and the y-2 axis 1200y, generate three new axes by merging the three axes of the first area 101 and the three axes of the second area 102, and output a user interface of the executed application through the foldable display 100, based on the newly generated three axes.

The instructions may further cause the processor 420 to generate an x-3 axis 1300x by merging the x-1 axis 1100x and the x-2 axis 1200x, generate a y-3 axis 1300y by merging the y-1 axis 1100y and the y-2 axis 1200y, generate a z-3 axis 1300z by merging the z-1 axis 1100z and the z-2 axis 1200z, and form the newly generated three axes with the x-3 axis 1300x, the y-3 axis 1300y, and the z-3 axis 1300z.

The instructions may further cause the processor 420 to output user interfaces of different applications on the first area 101 and the second area 102 in response to a user input for dividing a screen.

As described above, an electronic device 10 may include a housing 200 including a first housing structure 210 and a second housing structure 220 that is foldable relative to the first housing structure 210 about a first axis 200L, a foldable display 100 including a first portion 101 disposed in the first housing structure 210 and a second portion 102 disposed in the second housing structure 220, the first portion 101 being foldable relative to the second portion 102 about a second axis 100L parallel to the first axis 200L, a first motion sensor 510f disposed in the first housing structure 210, a second motion sensor 510s disposed in the second housing structure 220, a processor 420 located in the housing 200 and operatively coupled with the foldable display 100, the first motion sensor 510f, and the second motion sensor 510s, and a memory 430 operatively coupled with the processor 420.

The memory 430 may store instructions that, when executed, cause the processor 420 to receive first data from the first motion sensor 510f, receive second data from the second motion sensor 510s, output a first interface on the first portion 101 of the foldable display 100, output a second interface on the second portion 102 of the foldable display 100, and transmit at least part of the first data and/or the second data to the first interface and/or the second interface.

The second interface may correspond to a control interface capable of controlling the first interface.

As used herein, the term "module" may include a unit implemented in hardware, software, or firmware, and may interchangeably be used with other terms "logic," "logic block," "part," or "circuitry". A module may be a single integral component, or a minimum unit or part thereof, adapted to perform one or more functions. For example, the module may be implemented in a form of an application-specific integrated circuit (ASIC).

Embodiments as set forth herein may be implemented as software including one or more instructions that are stored in a storage medium that is readable by a machine. For example, the processor 420 of the electronic device 401 may invoke at least one of the one or more instructions stored in the storage medium, and execute the instructions, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" indicates that the storage medium is a tangible device, and does not include a signal, but this term does not differentiate between where data is semi-permanently or temporarily stored in the storage medium.

A method according to embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be downloaded or uploaded online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of modules or programs may be integrated into a single component. In such a case, the integrated component may still perform one or more functions of each of the plurality of components in the same or similar manner as they are performed by a corresponding one of the plurality of components before the integration. Operations performed by the module, the program, or another component may be performed sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a housing including a first housing structure and a second housing structure that is foldable relative to the first housing structure about a first axis;
   a foldable display including a first portion disposed in the first housing structure and a second portion disposed in the second housing structure, the first portion being foldable relative to the second portion about a second axis parallel to the first axis;
   a first motion sensor disposed in the first housing structure;
   a second motion sensor disposed in the second housing structure;
   a processor located in the housing and operatively coupled with the foldable display, the first motion sensor and the second motion sensor; and
   a memory operatively coupled with the processor, the memory storing instructions that, when executed, cause the processor to:
   output at least one user interface on at least one of the first portion and the second portion of the foldable display,
   obtain first data from the first motion sensor,
   obtain second data from the second motion sensor, and
   determine a direction of the user interface, based at least partly on the first data or the second data.

2. The electronic device of claim 1, wherein the instructions, when executed, further cause the processor to:
   select one of the first data and the second data, based at least partly on the first data and the second data, and
   use the selected one of the first data and the second data to determine the direction of the user interface.

3. The electronic device of claim 1, wherein the instructions, when executed, further cause the processor to:
   select one of the first data and the second data, based at least partly on the output user interface, and
   use the selected one of the first data and the second data to determine the direction of the user interface.

4. The electronic device of claim 1, wherein the instructions, when executed, further cause the processor to:
   determine an angle between the first portion and the second portion, based at least partly on the first data and the second data, and
   determine the direction of the user interface, based at least partly on the determined angle.

5. An electronic device comprising:
   a housing including a first edge, a second edge opposite the first edge, a third edge connected to a first end of the first edge and a first end of the second edge, a fourth edge connected to a second end of the first edge opposite to the first end of the first edge and a second end of the second edge opposite to the first end of the second edge, a hinge connected to the first edge and the second edge, a first housing structure corresponding to an area between the third edge and the hinge, and a second housing structure corresponding to an area between the fourth edge and the hinge, wherein each of the first edge and the second edge is foldable about the hinge, and wherein the first housing structure and the second housing structure face each other in a folded state of the first edge and the second edge;
   a foldable display including a first area extending from the hinge in a first direction and a second area extending from the hinge in a second direction opposite to the first direction;
   a first sensor disposed in the first housing structure;
   a second sensor disposed in the second housing structure;
   a memory configured to store a plurality of applications; and
   a processor configured to execute at least one of the plurality of applications,
   wherein the memory stores instructions that, when executed, cause the processor to:
   detect which of the first area and the second area includes a starting point at which a user interface of the executed application starts to be output on the foldable display based on the foldable display being folded,
   obtain data related to an area in which the starting point is located, from one of the first sensor and the second sensor that corresponds to the area in which the starting point is located, and
   determine whether to rotate the user interface in the area in which the starting point is located, based on the data.

6. The electronic device of claim 5, wherein the instructions, when executed, further cause the processor to turn off the first sensor or the second sensor corresponding to an area in which the starting point is not located.

7. The electronic device of claim 5, wherein the instructions, when executed, further cause the processor to rotate, on the foldable display in a perpendicular direction, the user interface in the area in which the starting point is located.

8. The electronic device of claim 5, wherein the foldable display includes an upper half screen extending in a third direction with respect to a horizontal axis perpendicular to the hinge and a lower half screen extending in a fourth direction with respect to the horizontal axis, and wherein the instructions, when executed, further cause the processor to output user interfaces of different applications on the upper half screen and the lower half screen based on a user input for dividing a screen of the foldable display.

9. The electronic device of claim 8, wherein the instructions, when executed, further cause the processor to:

move the user interfaces of the different applications to the first area and the second area based on the foldable display being folded, and rotate each of the user interfaces of the different applications on the first area and the second area.

10. The electronic device of claim 5, wherein the instructions further cause the processor to maintain the user interface of the executed application based on an angle between the first area and the second area being narrower than or equal to a specified value.

11. The electronic device of claim 5, wherein the first edge includes a first cut-off portion, wherein the second edge includes a second cut-off portion, and wherein the hinge extends from the first cut-off portion to the second cut-off portion.

12. The electronic device of claim 11, wherein the first edge is foldable about the first cut-off portion, and wherein the second edge is foldable about the second cut-off portion.

13. The electronic device of claim 5, wherein the housing further includes a first back cover disposed on a surface opposite to the first area and a second back cover disposed on a surface opposite to the second area.

14. The electronic device of claim 5, wherein the instructions, when executed, further cause the processor to measure:

in the first area, an x-1 axis that is perpendicular to the third edge and that extends toward the hinge from the third edge, a y-1 axis that is parallel to the third edge and that extends toward the second edge from the first edge, and a z-1 axis that is perpendicular to the x-1 axis and the y-1 axis, and in the second area, an x-2 axis that is perpendicular to the fourth edge and that extends toward the hinge from the fourth edge, a y-2 axis that is parallel to the fourth edge and that extends toward the second edge from the first edge, and a z-2 axis that is perpendicular to the x-2 axis and the y-2 axis.

15. The electronic device of claim 14, wherein the instructions, when executed, further cause the processor to:

generate an x-3 axis, a y-3 axis and a z-3 axis by merging the x-1, y-1, and z-1 axes of the first area and the x-2, y-2, and z-2 axes of the second area, respectively, and rotate the user interface of the executed application, based on the x-3, y-3 and z-3 axes.

16. An electronic device, comprising:

a housing including a first edge, a second edge opposite the first edge, a third edge connected to a first end of the first edge and a first end of the second edge, a fourth edge connected to a second end of the first edge opposite to the first end of the first edge and a second end of the second edge opposite to the first end of the second edge, a hinge connected to the first edge and the second edge, a first housing structure corresponding to an area between the third edge and the hinge, and a second housing structure corresponding to an area between the fourth edge and the hinge, wherein each of the first edge and the second edge is foldable about the hinge, and wherein the first housing structure and the second housing structure face each other in a folded state of the first edge and the second edge;

a foldable display including a first area extending from the hinge in a first direction and a second area extending from the hinge in a second direction opposite to the first direction;

a first sensor disposed in the first housing structure;

a second sensor disposed in the second housing structure;

a memory configured to store a plurality of applications; and a processor configured to execute at least one of the plurality of applications, wherein the memory stores instructions that, when executed, cause the processor to:

measure three axes of the first area, based on data obtained by the first sensor, wherein the three axes of the first area include an x-1 axis that is perpendicular to the third edge and that extends toward the hinge from the third edge, a y-1 axis that is parallel to the third edge and that extends toward the second edge from the first edge, and a z-1 axis that is perpendicular to the x-1 axis and the y-1 axis, measure three axes of the second area, based on data obtained by the second sensor, wherein the three axes of the second area include an x-2 axis that is perpendicular to the fourth edge and that extends toward the hinge from the fourth edge, a y-2 axis that is parallel to the fourth edge and that extends toward the second edge from the first edge, and a z-2 axis that is perpendicular to the x-2 axis and the y-2 axis, generate new three axes by merging the three axes of the first area and the three axes of the second area, and output a user interface of the executed application through the foldable display, based on the newly generated three axes.

17. The electronic device of claim 16, wherein the instructions cause the processor to:

generate an x-3 axis by merging the x-1 axis and the x-2 axis;

generate a y-3 axis by merging the y-1 axis and the y-2 axis;

generate a z-3 axis by merging the z-1 axis and the z-2 axis; and form the new three axes with the x-3 axis, the y-3 axis, and the z-3 axis.

18. The electronic device of claim 16, wherein the instructions, when executed, further cause the processor to output user interfaces of different applications on the first area and the second area based on a user input for dividing a screen of the foldable display.

19. An electronic device, comprising:

a housing including a first housing structure and a second housing structure that is foldable relative to the first housing structure about a first axis;

a foldable display including a first portion disposed in the first housing structure and a second portion disposed in the second housing structure, the first portion being foldable relative to the second portion about a second axis parallel to the first axis;

a first motion sensor disposed in the first housing structure;

a second motion sensor disposed in the second housing structure;

a processor located in the housing and operatively coupled with the foldable display, the first motion sensor, and the second motion sensor; and a memory operatively coupled with the processor, wherein the memory stores instructions that, when executed, cause the processor to:
  obtain first data from the first motion sensor,
  obtain second data from the second motion sensor,
  output a first interface on the first portion of the foldable display,
  output a second interface on the second portion of the foldable display, and
  transmit at least part of the first data or the second data to at least one of the first interface or the second interface.

20. The electronic device of claim 19, wherein the second interface corresponds to a control interface configured to control the first interface.

\* \* \* \* \*